United States Patent [19]
Thompson

[11] Patent Number: 4,898,248
[45] Date of Patent: Feb. 6, 1990

[54] HYDRAULIC DEVICE

[76] Inventor: Owen R. Thompson, 1105 Colonel Anderson, Louisville, Ky. 40222

[21] Appl. No.: 197,520

[22] Filed: Aug. 1, 1988

[51] Int. Cl.[4] ........................ B23Q 5/00
[52] U.S. Cl. ........................ 173/12; 81/463; 81/470
[58] Field of Search ........................ 173/12; 81/463, 470

[56] References Cited

U.S. PATENT DOCUMENTS 4,522,269 6/1985 Adman et al. ........................ 173/12

*Primary Examiner*—Frank T. Yost
*Assistant Examiner*—Willmon Fridig, Jr.
*Attorney, Agent, or Firm*—Edward M. Steutermann

[57] ABSTRACT

Method and apparatus for tightening rotatable fastener elements including a source of pressurized fluid, a first rotatable actuator having a rotatable output shaft operable in response to fluid flow through the first actuator, first control to allow the first actuator shaft to operate to a first fluid pressure established by the pressure of the source of pressurized fluid, switching device operable in response to the attainment of the first fluid pressure, to supply pressurized fluid to a second rotating actuator device connected to operate the output shaft through a portion of a rotation in response to the attainment of the first pressure to secure the fastener to a selected torque.

1 Claim, 3 Drawing Sheets

HYDRAULIC DEVICE

BACKGROUND OF THE INVENTION

The present invention relates, in general, to power devices for securing rotatable fastener elements such as screws, nuts, etc. and more particularly to fluid powered devices. In general such devices engage in multiple rotation of a fastener holder, such as a socket wrench and the device rotates until a "stall" point when the torque applied to the device is equal to the resistance of the fastener to further rotation. This point is generally somewhat less than the final desired rotation required to send the fastener element "home". In other applications it is desirable to rotate the fastening element to a selected final torque. In either case an initial multi rotational sequence is required followed by a final rotation to the desired torque or "home" position. In virtually, all cases the apparatus can be designed so that the difference between the "stall" position and the final position or final torque is less than one full rotation of the shaft.

When motorized rotation devices are employed another factor also affecting the seating of the fastener device is the inertial reservoir provided by the momentum generated as a function of the rotational speed at which the equipment operates and the mass of the rotating members thus resulting in a reservoir of energy to be applied at the end of the rotational sequence. The problem is that the inertial energy the resistance to rotation varies from fastening element to fastening element. Where a sequence of elements is to be secured to a selected torque or position it becomes necessary to also provide a final adjustment of the torque or position.

The prior art includes U.S. Pat. No. 2,893,278 which provides some similar aspects of the present invention. However, the present invention is distinguishable, and an improvement over the features of the teachings of the U.S. Pat. No. 2,983,278, specifically, because the reference teaches a motor which is not part of an overall fluid power loop as in the present case and is not operated in response to characteristic changes within the loop. On the contrary, motor for example an electric motor is taught by the reference to turns shaft to a preselected position at which time the motor stalls out and a second driving mechanism, a fluid actuator is engaged to drive the fastening element to the final "home" position or final torque.

Likewise U.S. Pat. No. 3,952,176 teaches an arrangement where tightening of the fastener element is accomplished by rotational element and where the final torque adjustment is accomplished by the engagement of a rack and pinion device which moves to finally secure the element to the final torque.

The present invention is likewise distinguishable over this reference inasmuch as in the present invention both of the actuator elements are rotatary devices, connected to the same shaft in generally coaxial relationship and operable from the same power loops.

Additional prior art arrangements are shown in U.S. Pat. No. 3,587,365, U.S. Pat. No. 3,834,467, and U.S. Pat. No. 3,845,673.

In summary, no prior art arrangement is known which provides the advantagous fluid power circuit provided by the present invention to secure a rotatable fastener to a selected position or to a selected torque in the manner described and claimed hereinafter.

SUMMARY OF THE INVENTION

The present invention relates to a new, useful, and highly efficient apparatus and method for accomplishing final positioning and tightening of a rotatable fastener device such as a screw, nut, or other similar device. Devices within the scope of the present invention provide the means to efficiently, quickly, and accurately, adjust the final torque of the fastener element with a light weight and relatively inexpensive final element. The final elements within the scope of the present invention can be easily manipulated by an operator and are not bulky in design so that they- can be utilized in relatively closely confined work areas.

Devices within the scope of the present invention for tightening rotatable fastener elements include in general a source of pressurized fluid, a first rotatable actuator having a rotatable output shaft operable through multiple turns in response to fluid flow through the first actuator, first control to allow the first actuator to operate until a first fluid pressure provided by the source of pressurized fluid is achieved, switching means operable in response to the attainment of the first fluid pressure, and a second rotating actuator device, operated by the switching means, and connected to operate the output shaft through a portion of a rotation in response to the attainment of the first pressure. The switching can be accomplished either by fluid or electrical switching.

Examples within the scope of the present invention are illustrated in the accompanying drawings and described in some detail hereinafter but it will be understood that various other arrangements also within the scope of the present invention will become obvious to those skilled in the art upond reading the disclosure set forth hereinafter.

BRIEF DESCRIPTION OF THE DRAWINGS

Referring now to the Figures which illustrate one example of an arrangement within the scope of the present invention.

DETAILED DESCRIPTION OF THE DRAWINGS

Figure 1:
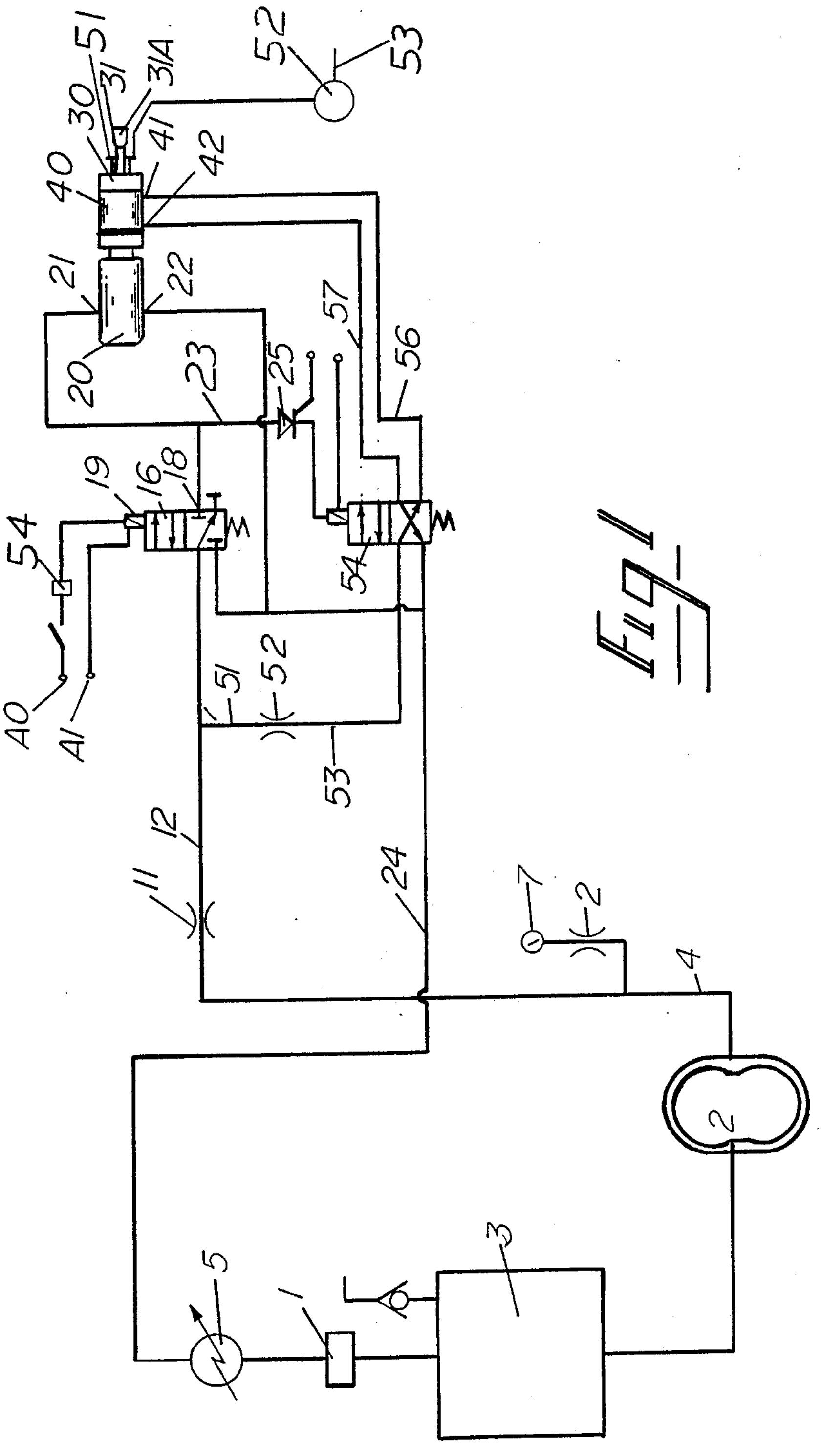
FIG. 1 is fluid schematic of an example of an arrangement within the scope of the present invention.

FIG. 1 is a schematic illustration of an example of an arrangement within the scope of the present invention where fluid flow is provided by a pump 1 which is driven by a motor (not shown) to provide fluid, for example hydraulic fluid, from a reservoir 3 to an outlet 4. Pressure at outlet 4 can be monitored by means of a gauge 7 supplied through a restrictor 2 to dampen instability in the reading.

As is known in the art a heat exchanger 5 can be provided to cool the fluid being returned to the reservoir 3 through a filter 1 to maintain the quality of the hydraulic fluid.

The pressurized fluid is provided through the outlet 4 thorough an orifice 11 which is provided to supply reduced fluid pressure at the outlet 12 to a normally closed spring offset solenoid operated valve 16 as shown. A return 17 can be provided so when the valve is in the unactivated condition any leaking fluid is returned by means of the return system described hereinafter.

The outlet 18 from the valve 16 is supplied to a fluid power device, for example in this case hydraulic motor 20 which has an output shaft 31 which is rotated in response to flow of fluid through the actuator, as is known in the art. The fluid is received at an inlet 21, and is emitted through an outlet 22. As shown inlet 21 is connected to the outlet 18 of solenoid valve 16. A second connection 23 is provided to a pressure switch 24 which is actuated as described hereinafter.

Additionally, it will be noted that the solenoid element 19 of the solenoid valve assembly 16 is actuated by closure of normally open switch SW1 which is supplied through a circuit including terminals A0 and A1 where the switch initiates operation of a tightening cycle all as described herein.

The shaft 31 likewise extends through a torque producing device 40 described hereinafter so that the output shaft 31 is provided to be connected to the element to be tightened which can be received, for example in a coupling 31A.

Also, in the arrangement shown the return from outlet 22 of motor 20 and the return 17 from the solenoid valve 16 are connected to a common return line 23 which is connected, in turn, to the return line 24 and the filter 5.

Figure 2:
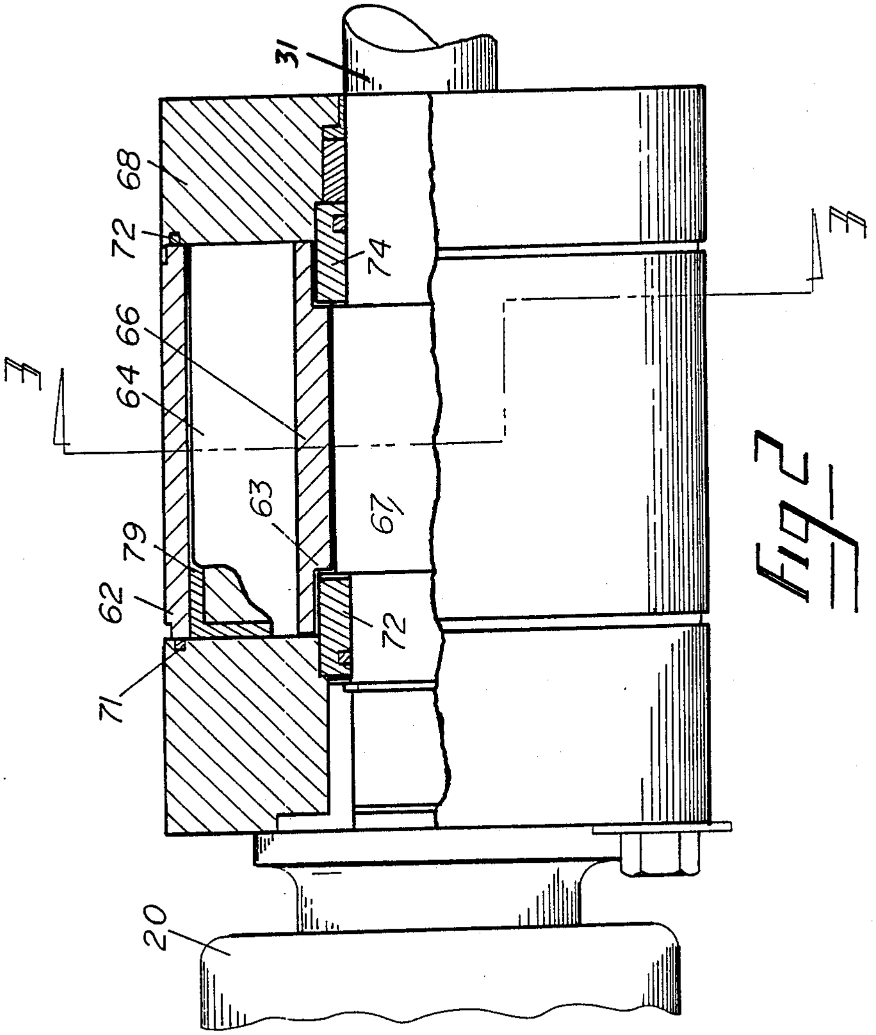
FIG. 2 is cross sectional view of a final element within the present invention.
Figure 3:
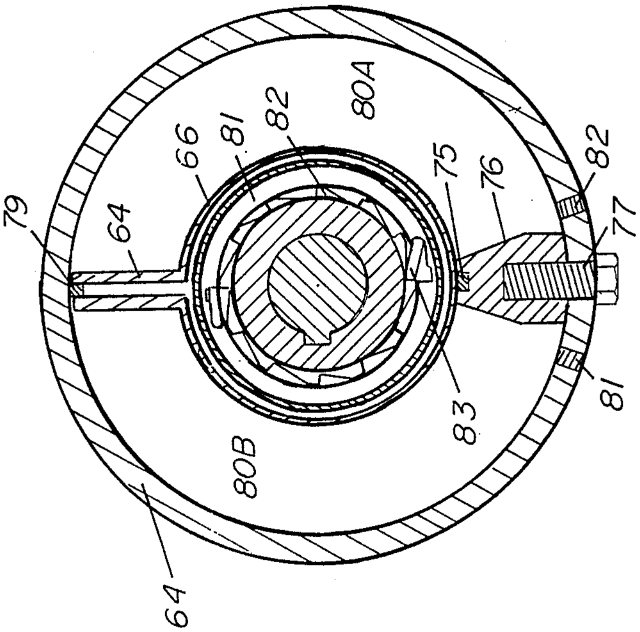
FIG. 3 is view take along a plane passing through line 3—3 of 2.

In accordance with another feature of the present the final "turn down" is provided by the torque amplifier 40, an example of which is illustrated in FIGS. 2 and 3 and described hereinafter.

However, referring now to FIG. 1 the outlet 12 from the orifice 11 is supplied by means of a conduit 51 through a second orifice 52 which provides an outlet pressure 53 and flow of fluid to the final torque element 40 which only turns for a portion of a full rotation. In the arrangement shown solenoid 54 which, can be a spring offset solenoid return actuator and, in the position shown, the fluid from outlet 53 of orifice 52 is supplied through the solenoid 54 through to a conduit 56 and to one inlet 41 of the actuator 40. The outlet fluid is emitted by means of an outlet 42 through a conduit 57 to be supplied to the return conduit 24.

Thus, in the position shown in FIG. 1 with the solenoid 54 in the normal position the fluid pressure urges the torque amplifier to a "home" position at one end of the arc of rotation as described hereinafter. Upon actuation of the solenoid element 57 by the pressure switch 24 after the motor 20 has rotated to its limit and stalled so the fluid pressure increases to trip switch 24 is tipped so the valve element shifts so that pressurized fluid is supplied to the inlet 41 and the return is from the outlet 42 to move the torque producing device through a portion of a turn to finally adjust the torque of the fastener.

As shown in FIG. 2 the final torque multiplying element is a vane type actuator so that very little flow rotation occurs but a great deal of force can be generated determined by available pressure.

In operation, the switch SW1 is actuated to commence flow of fluid through the hydraulic motor 20 so that the shaft 31 commences rotation. When a selected fluid pressure is reached indicating motor 20 has stalled or reach a given level the switch 24 is actuated to actuate solenoid 57 which then operates the element of solenoid 54 to supply pressurized fluid to the inlet 41 of the torque multiplier 40 of attainment of a selected torque determined by strain gage 30 carried at the outlet of both solenoids 16 and 54 are returned to there normal position, as fluid pressure is reversed to torque multiplier 40 and the device internally reverses to its "home" position and the cycle can then be repeated by again closing the switch SW1.

FIG. 2 is an illustration of the torque element shown in FIG. 1 which includes the hydraulic motor 20 and the torque multiplier 40 the hydraulic motor is shown and can, or example, be a Gresen Model MGG 200-30-BB-6L3 fluid power motor and the high torque producer as described hereinafter can be a vane actuator as shown in FIGS. 2 and 3. In FIG. 2 a tube body 62 is shown and adopted to receive a vane rotor assembly 63 which carries a vane element 64 and is received in a ratchet assembly 67 described hereinafter with reference to FIG. 3 which provides the final torque application to shaft 31. End caps 68, 69 are provided at opposite ends of tube 62 and "0" ring seals 71, 72 can be provided to prevent fluid leakage from the unit. Bushings 73 and 74 are provided to engage the endcaps 78, 69 to hold shaft 31 in alignment.

Hydraulic motor 20 is connected to shaft 31 and ratchet drive 61 is provided to be operated by a vane actuator 62 which includes vane elements 63 as shown in FIG. 3.

Outlet shaft 31 is provided from the element as shown in FIG. 1 and a transducer end cap 64 provided at the shaft outlet from the vane actuator 62.

Referring to FIG. 3 which is a cross section of the vane actuator 40 the tube 62 is provided with a stator member 76 secured by means of a bolt 77 through the tube 62, stator 76 has a groove adapted to receive a seal 75 which engages the vane element 66 in sealing relation. Vane member 64 is provided within the device and is carried by the vane element 66 which is journaled at opposite ends by bushings 73 for rotation therein. A seal member 79 is provided to extend around the open edges of vane 64 to engage the inner surface of tube 64 and endwalls 68, and 69 to define chambers 80A and 80B on opposite sides of vane 64 and stator 76 aperture 81 and exhausted through aperture 82 to move vane 64 in one direction and flows conversely to move vane 64 in its opposite direction. The shaft 31 from motor 20 is located as shown and carries a ratchet 82 to be engaged for rotation with vane element 64 in one direction to apply fluid torque. Pawls 83 are provided within a second ring 81 carried by the vane element 66 for engagement with the teeth of ratchet element 82. The pawls are adapted to engage the teeth of ratchet ring 82 as the vane 64 is operated in one direction, in this case clockwise rotation in response to introduction of fluid through an inlet 81 and fluid exhaust through outlet 82. Conversely, when the solenoid valve 54 switches so vane 64 returns to a "home" position with the pawls 83 are disengaged from teeth of ratchet ring 82.

Figure 4:
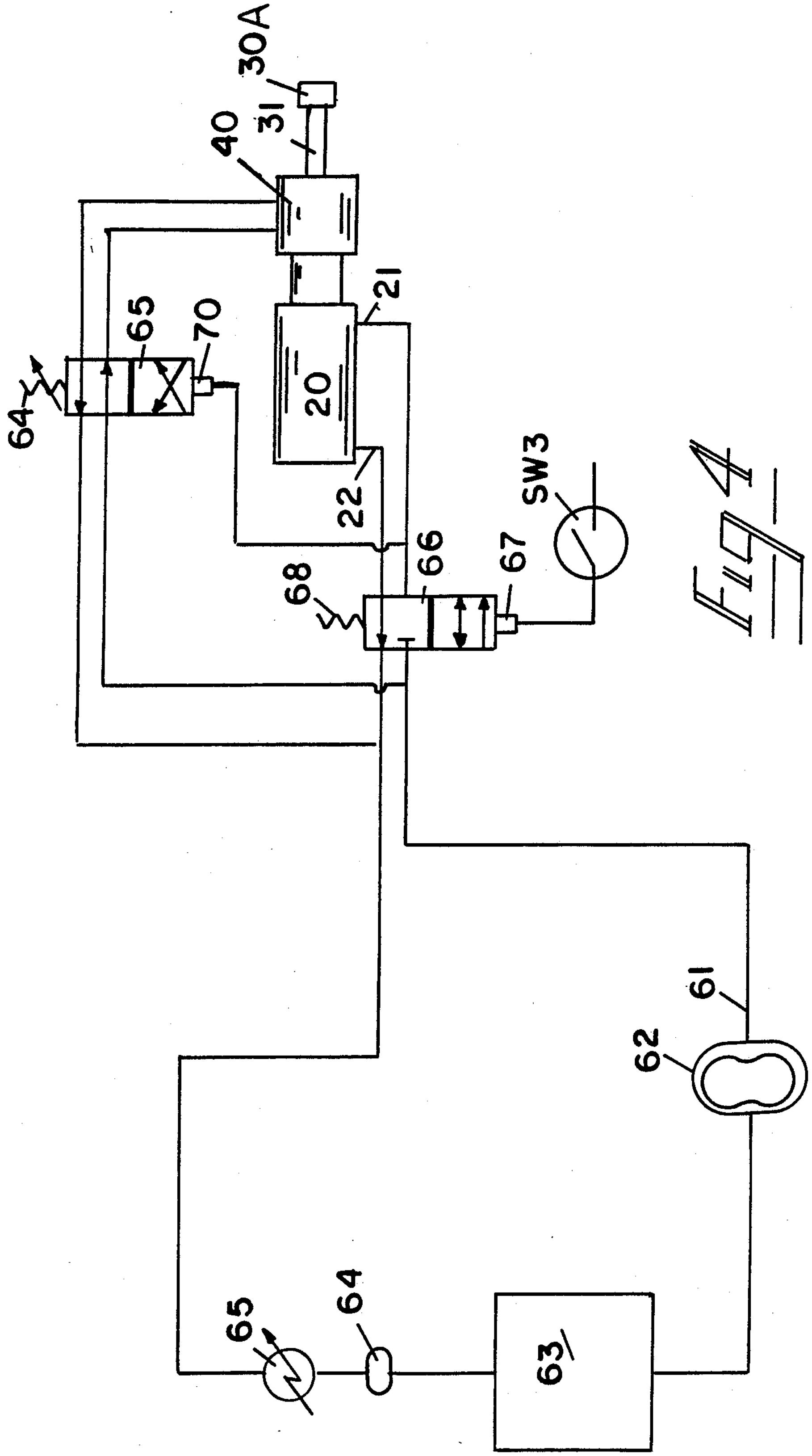
FIG. 4 is a schematic illustration of another arrangement within the scope of the present invention.

FIG. 4 is a schematic illustration of another arrangement within the scope of the present invention which is entirely hydraulicly operated except for the initiation of the device and described hereinafter.

Referring to FIG. 4, a reservoir 3 is provided having a filter 1 and a heat exchanger 5 for cooling and cleaning of the hydraulic fluid. The fluid is supplied from reservoir 3 to a pump 2 to a high pressure outlet 4. High pressure outlet 4 is connected to a normally closed inlet of a solenoid valve 96 having an outlet 21, corresponding to outlet 21 as shown in FIG. 1, to a hydraulic motor 20. An outlet 22 from the motor 20 is supplied through the solenoid valve 96 to the return line to reservoir 3 as shown.

A second flow regulating valve 94 is provided having a pressure responsive plunger 90 which is connected to be operated by the fluid pressure at inlet 21 of the actuator 20. An adjustable spring 99 is provided for to allow shifting of the spool element within the valve from the straight through flow pattern shown to cross flow pattern in the shifted position.

The fluid motor 20 and the torque adjusting element 40 are the same as shown in FIG. 1 in operation, that is, operation of the tightening element is initiated by closing the switch SW3 which transfers the position of the solenoid 97 so flow occurs from through Line 4 to the fluid motor 20 and returns by means of the outlet 22 to reservoir 3.

At a point where the fluid motor 20 reaches its maximum torque and stalls the fluid pressure at inlet 21 increases rapidly, is transmitted to the pressure piston 90 which overcomes the bias force exerted by the adjustable spring 99 and causes the spool element of valve 94 to shift. Up until this time fluid pressure through valve 94 has to the final torque element 40 has held the vane in its "home" position.

Upon the attainment of sufficient pressure at the inlet 21 of the motor 20 to overcome the bias of the spring 99 the spool or valve element 94 shifts and crossflow occurs so that pressurized fluid is supplied to the opposite side of the vane in the torque element 40 causing the vane to rotate shaft 31 to a torque determined by the pressure available at the outlet of pump 2. Fluid return occurs to the reservoir from the other side of the vane of element 40 but, as previously described, only a small amount of fluid is returned so that back pressure is minimal.

On attainment of the final torque the switch SW3 can be closed returning the spool of valve 96 to the position shown which releases pressure from the pressure switch 70 and allows the spool element of valve 94 to return to its normal position as shown in FIG. 4.

Of course the advantage of the arrangement has shown in FIG. 4 is that the circuit is virtually entirely hydraulic, does not require electronic pressure transducers, and yet accomplishes all of the features of the arrangements shown in FIG. 1.

The foregoing is a description of one arrangement within the scope of the present invention but it will be understood that various other arrangements also within the scope of the present invention will occur to those skilled in the art upon reading the disclosure set forth hereinbefore.

The invention claimed is:

1. Apparatus for tightening rotatable fastener including: a source of pressurized fluid, to supply fluid at selected pressure, first multiple rotating actuator means adapted to rotate shaft means; socket means connected to said shaft means to receive said fastener element to be tightened; pressure switch means adapted to operate said first multiple rotating actuator means and rotate said shaft until fluid pressure provided by said source of pressurized fluid reaches a first pressure less than said selected pressure; switch means operable in response to the attainment of said first pressure, to supply said pressurized fluid to a second rotary actuator means and connect said second actuator means to said shaft means to rotate said shaft means through a portion of a full rotation at higher torque than provided by said first actuator means where said second rotary actuator means includes a tubular housing adapted to receive said shaft in generally central longitudinal alignment therein and vane means rotatable therein about said shaft between first and second limits in response to said pressurized fluid wherein ratchet means are provided to engage said vane and said shaft to rotate said shaft through a portion of a revolution when said vane is moved in a first direction and said vane is disengaged from said shaft when said vane is moved in a second direction; first and second pressurized fluid flow ports in said housing located so that admission of pressurized fluid to said first port and emission of said pressurized fluid from said second port rotate said vane in said first direction and admission of fluid through said second port and emission of pressurized fluid from said first port rotates said vane in said second direction; valve means operable in response to said pressure switch between first valve position to normally admit pressurized fluid to said second port and hold said vane at said first limit and second position to admit said pressurized fluid to said first port to move said shaft in said first direction.

* * * * *